United States Patent
Hunt

(10) Patent No.: US 8,090,264 B2
(45) Date of Patent: Jan. 3, 2012

(54) ARCHITECTURE FOR ENABLING NETWORK CENTRIC COMMUNICATIONS, SENSING, COMPUTATION, AND INFORMATION ASSURANCE

(75) Inventor: Jeffrey H. Hunt, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 554 days.

(21) Appl. No.: 12/276,695

(22) Filed: Nov. 24, 2008

(65) Prior Publication Data

US 2010/0127852 A1   May 27, 2010

(51) Int. Cl.
*H04B 10/00* (2006.01)
(52) U.S. Cl. .................... 398/131; 398/124; 398/125
(58) Field of Classification Search .......... 398/116, 398/122, 124–125, 127–131
See application file for complete search history.

(56) References Cited

U.S. PATENT DOCUMENTS

| | | |
|---|---|---|
| 6,822,305 B2 | 11/2004 | Hunt |
| 6,850,359 B2 | 2/2005 | Hunt et al. |
| 6,897,998 B2 | 5/2005 | Nee et al. |
| 7,154,658 B2 | 12/2006 | Maram et al. |
| 7,283,291 B2 | 10/2007 | Maram et al. |
| 2003/0169335 A1 * | 9/2003 | Monroe ................... 348/143 |
| 2005/0079880 A1 * | 4/2005 | Donner et al. ............. 455/466 |
| 2008/0031213 A1 * | 2/2008 | Kaiser et al. .............. 370/338 |
| 2008/0238651 A1 * | 10/2008 | Kucharyson .............. 340/506 |

OTHER PUBLICATIONS

Smith, Edward Jr. et al; "Towards a Synthesis of Complex Adaptive Systems Theory and Effects Based Approaches to Operations, Warfighters to Coalitions: A Case Study of Multi-level Adaptation in Effects-Based Operations" 11th ICCRTS Cambridge, UK Sep. 2006 Draft Paper.

* cited by examiner

*Primary Examiner* — Dzung Tran
(74) *Attorney, Agent, or Firm* — Klintworth & Rozenblat IP LLC

(57) ABSTRACT

A free-space network may include: at least one free-space sensor for sensing at least one uncooperative target; at least one free-space communications network for allowing a plurality of cooperative users to communicate, at least one free-space processor for processing information from the at least one free-space sensor and information from the at least one free-space communications network; and at least one free-space communications link connecting in free-space the at least one free-space sensor, the at least one free-space communications network, and the at least one free-space processor. The at least one free-space communications network may include a plurality of free-space multi-channel relay converters for tracking a plurality of cooperative users, and a connection system for aligning the plurality of free-space multi-channel relay converters with one another to allow a plurality of cooperative users to communicate.

17 Claims, 2 Drawing Sheets

US 8,090,264 B2

ARCHITECTURE FOR ENABLING NETWORK CENTRIC COMMUNICATIONS, SENSING, COMPUTATION, AND INFORMATION ASSURANCE

FIELD OF THE INVENTION

The present disclosure relates to a free-space architecture for enabling network centric communications, sensing, computation, and/or information assurance.

BACKGROUND

Targeting systems are typically described as point-to-point architectures. That is, all of the information required to target and physically characterize an object and the hardware associated with such targeting, may be held within one physical platform. The target object itself may be sensed by imaging, spectroscopy, lidar, some combination of these, and/or by other sensing methods. Each of these processes may be defined by the collection, in some format, of the electromagnetic energy emanating from it, and by the conversion, through some physical process, into electronically accessible information. The processes may also include a processor for interpreting the data associated with the electronically accessible information. In passive targeting systems, a single sensing receiver or multiple receivers is often located on the platform. In active targeting systems, a sensing source and receiver are both often co-located on the same platform. There are problems with these systems, such as the mechanical constraints caused by having a large amount of weight and volume on one platform, making deployment in air and space-borne geometries challenging. In addition, imaging and more generally, sensing, may be constrained to the two dimensional case. Sensors that are not networked may have to process data on a single platform before sharing the information. This local processing may lead to premature data truncation, causing loss of information before sharing with data collected from other geographical areas. Areas that are crowded with non-target objects may face partial or complete obscuration.

A network and/or method of forming and using a network is needed to address one or more problems associated with one or more of the existing networks and/or methods.

SUMMARY

In one embodiment, a free-space network is disclosed. The free-space network may include: at least one free-space sensor for sensing at least one uncooperative target; at least one free-space communications network for allowing a plurality of cooperative users to communicate, at least one free-space processor for processing information from the at least one free-space sensor and information from the at least one free-space communications network; and at least one free-space communications link connecting in free-space the at least one free-space sensor, the at least one free-space communications network, and the at least one free-space processor. The at least one free-space communications network may include a plurality of free-space multi-channel relay converters for tracking a plurality of cooperative users, and a connection system for aligning the plurality of free-space multi-channel relay converters with one another to allow a plurality of cooperative users to communicate.

In another embodiment, a free-space network is disclosed. The free-space network may include: at least one free-space spectral sensor for sensing at least one uncooperative target using spectral signals; at least one free-space imaging sensor for sensing at least one uncooperative target using imaging signals; at least one free-space storage device for storing information from the at least one free-space spectral sensor and for storing information from the at least one free-space imaging sensor; at least one free-space processor for processing information from the at least one free-space spectral sensor and for processing information from the at least one free-space imaging sensor; and at least one free-space communications link connecting in free-space the at least one free-space spectral sensor, the at least one free-space imaging sensor, the at least one free-space processor, and the at least one free-space storage device.

In still another embodiment, a method of forming and using a free-space network is disclosed. In one step, at least one free-space sensor may be provided. In another step, at least one free-space communications network may be provided. In an additional step, at least one free-space processor may be provided. In yet another step, the at least one free-space sensor, the at least one free-space communications network, and the at least one free-space processor may be connected using at least one free-space communications link. In an additional step, a plurality of cooperative users may communicate over the free-space communications network. In another step, at least one uncooperative target may be sensed using the at least one free-space sensor.

These and other features, aspects and advantages of the disclosure will become better understood with reference to the following drawings, description and claims.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
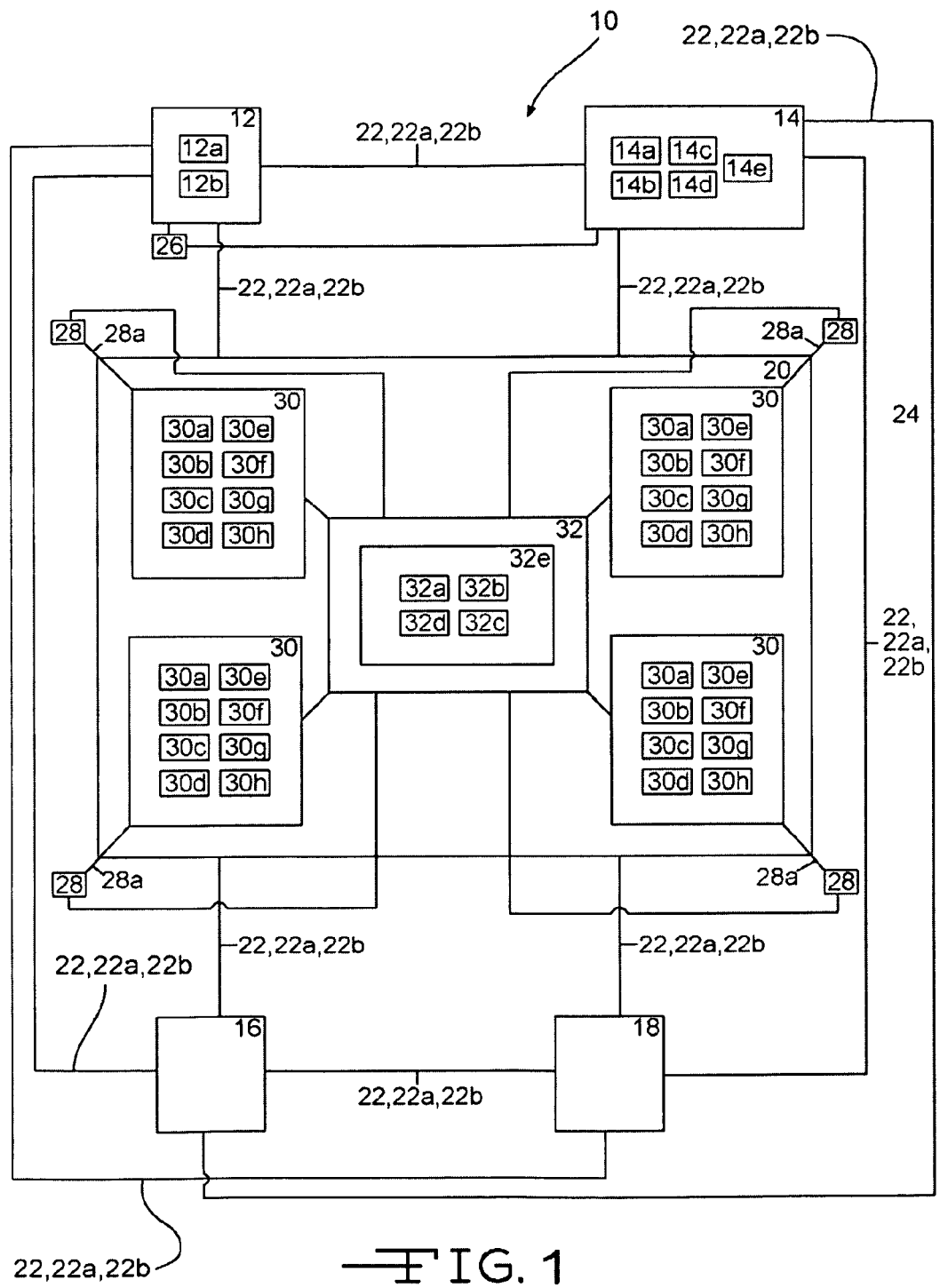
FIG. 1 is a box diagram illustrating an exemplary embodiment of a free-space network.

FIG. 1 is a box diagram of one embodiment of a free-space network 10. The free-space network 10 may include: one or more free-space sensors 12, one or more free-space sources 14, one or more free-space information storage devices 16, one or more free-space processors 18, one or more free-space communications networks 20, and/or one or more free-space communications links 22. The one or more free-space communications networks 20 may be multi-spectral, hybrid spectral, optical, terahertz, microwave, radio-wave, and/or may utilize another type of communication. Each of the components 12-22 listed above may be geographically dispersed in free-space 24 relative to one another, and may be ground-based, air-based, and/or space-based. In other embodiments, the configuration of the free-space network 10 may vary, different numbers of the components 12-22 may be used, and/or other types of components may be used.

The free-space sources 14 may be coherent sources such as lasers, incoherent sources such as non-laser lights, single frequency spectra sources, broadband sources, and/or may be of another type. The free-space sources 14 may include one or more spectral sources 14*a*, one or more imaging sources 14*b*, and/or other types of sources. The free-space sources 14 may be adapted to emit signals 14*c* which may comprise spectral signals 14*d*, imaging signals 14*e*, and/or other types of signals. The free-space sensors 12 may include one or more spectral sensors 12*a*, one or more imaging sensors 12*b*, and/or other types of sensors. The free-space sensors 12 may be adapted to sense at least one uncooperative target 26, such as a hostile aircraft and/or other type of uncooperative target, based on the signals 14*c* emitted by the free-space sources 14.

The free-space information storage devices 16 may be adapted to store information from the free-space sensors 12 and information from the free-space communications networks 20. The free-space processors 18 may be adapted to process information from the free-space sensors 12 and/or from the free-space communications networks 20. The free-space communications links 22 may be adapted to connect in free-space 24 the free-space sensors 12, the free-space sources 14, the free-space information storage devices 16, the free space processors 18, and/or the free-space communications networks 20. The free-space communications links 22 may comprise optical lasers 22*a*, radio frequency links 22*b*, and/or other type of communications links.

The free-space communications networks 20 may be adapted to allow a plurality of geographically distributed cooperative users 28, such as friendly aircraft, to communicate with one another using optical propagation, and/or another type of communication type, even if the cooperative users 28 may not be aligned in a "line of sight." The networks 20 may be ground-based, air-based, and/or space-based. The free-space communications networks 20 may comprise a plurality of free-space multi-channel relay converters 30 and a connection system 32 in communication with each of the free-space multi-channel relay converters 30. There may be a separate free-space multi-channel relay converter 30 for every cooperative user 28. Each cooperative user 28 may emit a signal beam 28*a*. Each of the separate free-space multi-channel relay converters 30 may be adapted to independently track a separate respective cooperative user 28. Each free-space communications network 20 may comprise three or more multi-channel relay converters 30, and three or more cooperative users 28.

Each of the free-space multi-channel relay converters 30 may comprise: a telescope 30*a*, which may be optical or another type, for collecting and propagating light; a detector 30*b* for detecting light; an alignment cube 30*c* for providing location information to a cooperative user 28; an alignment laser 30*d* for finding and tracking a cooperative user 28; intensity conditioning devices 30*e*, such as intensity conditioning optics and/or other types of intensity conditioning devices; polarization conditioning devices 30*f*, such as polarization conditioning optics and/or other types of polarization conditioning devices; wavelength and bandwidth conditioning devices 30*g*, such as wavelength and optical bandwidth conditioning optics and/or other types of wavelength and bandwidth conditioning devices; and optionally may additionally comprise adaptive devices 30*h*, such as adaptive optics and/or other types of adaptive devices. In other embodiments, the free-space multi-channel relay converters 30 may comprise any combination and/or number of the listed components 30*a* through 30*h*. In still other embodiments, other types of components may be used.

The telescope 30*a* may be comprised of one or more optical elements, of either refractive or reflective nature. In other embodiments, the telescope 30*a* may be of varying optical and/or non-optical types. The design is meant only to collect electromagnetic radiation and does not need to image the cooperative users 28 in question. The detector 30*b* may be a simple photodiode which looks only for intensity or it may be an imaging plane, useful for physically locating the cooperative user 28. The alignment cube 30*c* may be a corner cube, composed of three mutually perpendicular reflective planes. The corner cube may have the property that any light pointed at it will be reflected along a path parallel to the incoming light. As such, it may send a return signal to an illumination source, and/or another type of source, thereby providing a highly visible location signal for tracking. The alignment laser 30*d* may be any of several types, but a solid state medium laser, including diode lasers, are the preferable types. The laser 30*d* may be mounted on the side of the telescope 30*a* or it may be mounted in such a way as to propagate out through the telescope 30*a*. The intensity conditioning devices 30*e* may include optical filters, non-optical intensity conditioning devices, and/or may include other control techniques, such as polarizer/rotator combinations. The polarization conditioning devices 30*f* may include optical elements which may have polarization sensitivity. This may include polarizers, but may also include other polarization sensitive optical elements, such as waveplates. In other embodiments, the polarization conditioning devices 30*f* may vary in type, including non-optical. The bandwidth elements of the wavelength and bandwidth conditioning devices 30*g* will typically be an interference filter, such as a Fabry-Perot interferometer, and the wavelength control will typically have a broader spectral effect, such as a spectral filter or diffraction grating. In other embodiments, the wavelength and bandwidth conditioning devices 30*g* may vary in type.

The connection system 32 may include an internal alignment reference 32*a* and steering mirrors 32*b*. In one embodiment, there may be one set of steering mirrors 32*b* for each of the free-space multi-channel relay converters 30. The internal alignment reference 32*a* may comprise a point in three-dimensional space such as a hard target, a light spot exiting an optical fiber, or a hard target located at the end of a fiber. In other embodiments, the internal alignment reference 32*a* may comprise varied types of non-optical internal alignment references. The connection system 32 may further comprise a combination of beam splitters 32*c* and combiners 32*d* for aligning the plurality of free-space multi-channel relay converters 30 with one another to allow the cooperative users 28 to communicate. The beam splitters 32*c* may be optical and/or non-optical. The fiber devices 32*e* of the connection system 32 may comprise one or more of the internal alignment reference 32*a*, steering mirrors 32*b*, beam splitters 32*c*, and combiners 32*d*. The fiber devices 32*e* may be optical and/or non-optical. Each of the free-space multi-channel relays converters 30 may be adapted to independently align itself with the internal alignment reference 32*a*. The connection system 32 may be adapted to align the plurality of free-space multi-channel relay converters 30 with one another to allow the cooperative users 28 to communicate.

Figure 2:
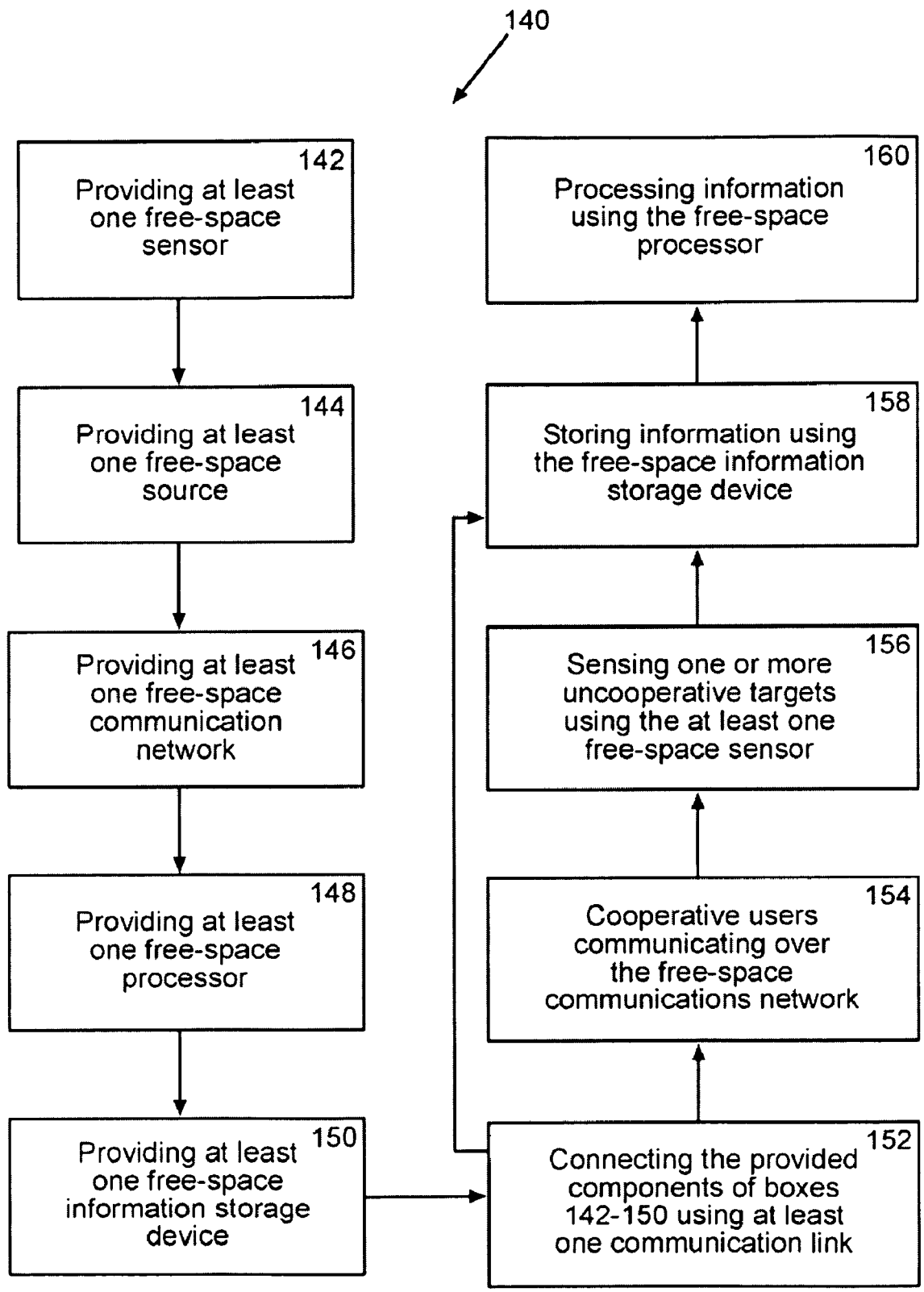
FIG. 2 is a flowchart illustrating an exemplary embodiment of a method of forming and using a free-space network. As used herein, the term exemplary indicates an example and not necessarily an ideal.

FIG. 2 is a flowchart of one embodiment of a method 140 of forming and using a free-space network 10. In step 142, at least one free-space sensor 12 may be provided. The free-space sensors 12 may include one or more spectral sensors 12*a*, one or more imaging sensors 12*b*, and/or other types of sensors. In step 144, at least one free-space source 14 may be provided. The free-space sources 14 may be coherent sources such as lasers, incoherent sources such as non-laser lights, single frequency spectra sources, broadband sources, and/or may be of another type. The free-space sources 14 may include one or more spectral sources 14*a*, one or more imaging sources 14*b*, and/or other types of sources. In step 146, at least one free-space communications network 20 may be provided. In step 148, at least one free-space processor 18 may be provided. In step 150, at least one free-space information storage device 16 may be provided. In step 152, the free-space sensor 12, the free-space source 14, the free-space communications network 20, the free-space processor 18, and the free-space information storage device 16 may be connected using one or more free-space communications links 22. The free-space communications links 22 may comprise an optical laser 22a, a radio frequency link 22b, and/or other type of communications link.

In step 154, cooperative users 28 may communicate over the free-space communications network 20. In step 156, one or more uncooperative targets 26 may be sensed using the at least one free-space sensor 12. In one embodiment, step 156 may further comprise the free-space sources 14 emitting signals 14c which may comprise spectral signals 14d, imaging signals 14e, and/or other types of signals which may be sensed by the free-space sensors 12. In step 158 information from the free-space sensor 12 and information from the free-space communications network 20 may be stored using the free-space information storage device 16. In step 160, information from the free-space sensor 12 and information from the free-space communications network 20 may be processed using the free-space processor 18.

The free-space communications network 20 may comprise a plurality of free-space multi-channel relay converters 30 and a connection system 32. The connection system 32 may comprise an internal alignment reference 32a and steering mirrors 32b. In one embodiment, step 154 may further comprise the steps of tracking the plurality of cooperative users 28 using the plurality of free-space multi-channel relay converters 30, and aligning the plurality of free-space multi-channel relay converters 30 with one another using the connection system 32.

Each of the components 12-22 listed above may be geographically dispersed in free-space 24 relative to one another, and may be ground-based, air-based, and/or space-based. In other embodiments, the configuration of the free-space network 10 may vary, different numbers of the components 12-22 may be used, and/or other types of components may be used.

One or more embodiments of the method 140 may provide information storage reduction, processing reduction, redundancy reduction, decentralized processing, ultrahigh bandwidth free-space communications, geographically dispersed sensing of uncooperative targets, and/or geographically dispersed communication between cooperative users.

One or more embodiments of the disclosure may provide an architecture that will enable physical hardware to be tied into network centric warfare. By locating the hardware components in geographically dispersed locations in a network architecture, the problems associated with locating the hardware components all on one platform may be reduced and/or eliminated. For instance, weight and volume on any one platform may be reduced, sensing and communications may occur over a large amount of free-space, sensing/imaging of targets may occur in three-dimensions, spectral imaging of targets may be used, areas that are crowded with non-target objects may be avoided, information propagation to all elements of a battle-space may be organic, target identification may occur faster and with greater reliability, real-time sensing and identification may occur, effector latencies associated with point-to-point systems may diminish or disappear, target intent may be determined with higher accuracy, and/or one or more other types of problems associated with point-to-point systems may be reduced and/or eliminated.

It should be understood, of course, that the foregoing relates to exemplary embodiments of the disclosure and that modifications may be made without departing from the spirit and scope of the disclosure as set forth in the following claims.

The invention claimed is:

1. A free-space network comprising:
at least one free-space sensor for sensing at least one uncooperative target;
at least one free-space communications network for allowing a plurality of cooperative users to communicate, wherein said at least one free-space communications network comprises a plurality of free-space multi-channel relay converters for tracking a plurality of cooperative users and a connection system for aligning the plurality of free-space multi-channel relay converters with one another to allow a plurality of cooperative users to communicate, wherein said connection system comprises an internal alignment reference and steering mirrors and each free-space multi-channel relay converter is adapted to align with the internal alignment reference;
at least one free-space processor for processing information from said at least one free-space sensor and information from said at least one free-space communications network; and
at least one free-space communications link connecting in free-space said at least one free-space sensor, said at least one free-space communications network, and said at least one free-space processor.

2. The free-space network of claim 1 further comprising at least one free-space information storage device for storing information from said at least one free-space sensor and for storing information from said at least one free-space communications network.

3. The free-space network of claim 1 further comprising at least one free-space source comprising at least one of a spectral source, an imaging source, a coherent source, a laser, an incoherent source, a non-laser light, a single frequency spectra source, or a broadband source.

4. The free-space network of claim 1 wherein said at least one free-space sensor comprises at least one of an imaging sensor or a spectral sensor.

5. The free-space network of claim 1 wherein said at least one free-space communications link comprises at least one of an optical laser or a radio frequency link.

6. The free-space network of claim 1 wherein the at least one free-space sensor, the at least one free-space communications network, and the at least one free-space processor are geographically dispersed in free-space.

7. A free-space network comprising:
at least one free-space spectral sensor for sensing at least one uncooperative target using spectral signals;
at least one free-space communications network for allowing a plurality of cooperative users to communicate, wherein said at least one free-space communications network comprises a plurality of free-space multi-channel relay converters for tracking a plurality of cooperative users and a connection system comprising an internal alignment reference and steering mirrors for aligning the plurality of free-space multi-channel relay converters with one another to allow the plurality of cooperative targets to communicate;
at least one free-space imaging sensor for sensing at least one uncooperative target using imaging signals;

at least one free-space storage device for storing information from said at least one free-space spectral sensor and for storing information from said at least one free-space imaging sensor;

at least one free-space processor for processing information from said at least one free-space spectral sensor and for processing information from said at least one free-space imaging sensor; and at least one free-space communications link connecting in free-space said at least one free-space spectral sensor, said at least one free-space imaging sensor, said at least one free-space processor, and said at least one free-space storage device.

8. The free-space network of claim 7 further comprising at least one free-space source comprising at least one of a spectral source for emitting spectral signals, an imaging source for emitting imaging signals, a coherent source, a laser, an incoherent source, a non-laser light, a single frequency spectra source, or a broadband source.

9. The free-space network of claim 7 wherein said at least one free-space communications link comprises at least one of a laser or a radio frequency link.

10. The free-space network of claim 7 wherein the at least one free-space spectral sensor, the at least one free-space imaging sensor, the at least one free-space storage device, and the at least one free-space processor are geographically dispersed in free-space.

11. A method of forming and using a free-space network comprising:

providing at least one free-space sensor;

providing at least one free-space communications network comprising a plurality of free-space multi-channel relay converters and a connection system comprising an internal alignment reference and steering mirrors;

providing at least one free-space processor;

connecting said at least one free-space sensor, said at least one free-space communications network, and said at least one free-space processor using at least one free-space communications link;

communicating between a plurality of cooperative users over the free-space communications network;

tracking the plurality of cooperative users using the plurality of free-space multi-channel relay converters;

aligning the plurality of free-space multi-channel relay converters with one another using the connection system; and sensing at least one uncooperative target using said at least one free-space sensor.

12. The method of claim 11 further comprising the step of processing information from said at least one free-space sensor and information from said at least one free-space communications network using said at least one free-space processor.

13. The method of claim 11 further comprising the steps of providing at least one free-space information storage device, and storing information from said at least one free-space sensor and from said at least one free-space communications network using said at least one free-space information storage device.

14. The method of claim 11 wherein the free-space sensor comprises at least one of a free-space spectral sensor or a free-space imaging sensor, and further comprising the steps of providing at least one free-space source comprising at least one of a spectral source, an imaging source, a coherent source, a laser, an incoherent source, a non-laser light, a single frequency spectra source, or a broadband source, and emitting at least one signal using said at least one free-space source in order to sense said at least one uncooperative target using said free-space sensor.

15. The method of claim 11 wherein said at least one free-space sensor, the at least one free-space communications network, and the at least one free-space processor are geographically dispersed in free-space.

16. The method of claim 11 wherein said at least one free-space communications link comprises at least one of an optical laser or a radio frequency link.

17. The method of claim 11 wherein the method provides at least one of information storage reduction, processing reduction, redundancy reduction, decentralized processing, ultra-high bandwidth free-space communications, geographically dispersed sensing of uncooperative targets, or geographically dispersed communication between cooperative users.

* * * * *